United States Patent [19]

Yamamori et al.

[11] 4,144,776
[45] Mar. 20, 1979

[54] CHANGE-SPEED PLANETARY TRANSMISSION

[75] Inventors: Takahiro Yamamori, Tokyo; Kunio Ohtsuka, Yokohama, both of Japan

[73] Assignee: Nissan Motor Company, Limited, Yokohama, Japan

[21] Appl. No.: 858,903

[22] Filed: Dec. 8, 1977

[30] Foreign Application Priority Data

Dec. 13, 1976 [JP] Japan .................. 51-148797

[51] Int. Cl.² .............................. F16H 57/10
[52] U.S. Cl. ..................................... 74/759
[58] Field of Search ..................... 74/759, 753

[56] References Cited

U.S. PATENT DOCUMENTS

| 3,736,815 | 6/1973 | Ito et al. ........................... 74/759 |
| 3,863,524 | 2/1975 | Mori et al. ..................... 74/759 X |
| 3,877,320 | 4/1975 | Iijima ................................ 74/759 |
| 3,979,974 | 9/1976 | Murakami ....................... 74/759 |
| 3,999,448 | 12/1976 | Murakami et al. ............. 74/759 |

FOREIGN PATENT DOCUMENTS 1505724  8/1970  Fed. Rep. of Germany ............. 74/759

*Primary Examiner*—Lance W. Chandler

[57] ABSTRACT

A four-speed transmission having an over drive is disclosed which comprises two basic planetary gearsets and one dual intermeshed planet pinion planetary gearset and three clutches and two brakes. The construction and arrangement is such that an appropriate reduction ratio is provided for each of forward speeds without causing rotary members between input and output shaft to rotate faster than the input and output shafts.

4 Claims, 5 Drawing Figures

CHANGE-SPEED PLANETARY TRANSMISSION

BACKGROUND OF THE INVENTION

The present invention relates to change-speed transmissions for motor vehicles which are driven by a prime mover through a torque converter or a fluid coupling.

Although a variety of four-speed transmissions including an over drive have thus far been proposed, they have the following disadvantages:

(1) If gear ratio for the fourth speed (overdrive) is selected at an appropriate value, gear ratios for the first, second and third speeds will become remote from practical optimum values and vice versa.

(2) There is a rotary element which will rotate faster than an input shaft or an output shaft during frequently used operation range from the first speed to the fourth speed, so that a shaft rotatably journaling the rotary element will be overloaded and high speed rotation of the rotary element will cause a rattle.

Automotive vehicles installed with an automatic transmission are generally worse in fuel economy than their counterparts installed with a manual transmission. To solve this disadvantage of automatic transmissions, an automatic transmission having an over drive is proposed. A conventional automatic four-speed transmission with an over drive has a disadvantage that the gear ratio for a particular speed is not suitable for automotive vehicles. Another disadvantage is that there is a rotary element which rotates far faster than an input shaft.

SUMMARY OF THE INVENTION

It is an object of the present invention to provide a change-speed transmission which has an over drive and provides gear ratios suitable for all speeds, respectively.

It is another object of the present invention to provide a change-speed transmission of the above character which includes a plurality of planetary gearsets.

DESCRIPTION OF THE PREFERRED EMBODIMENTS

Figure 1:
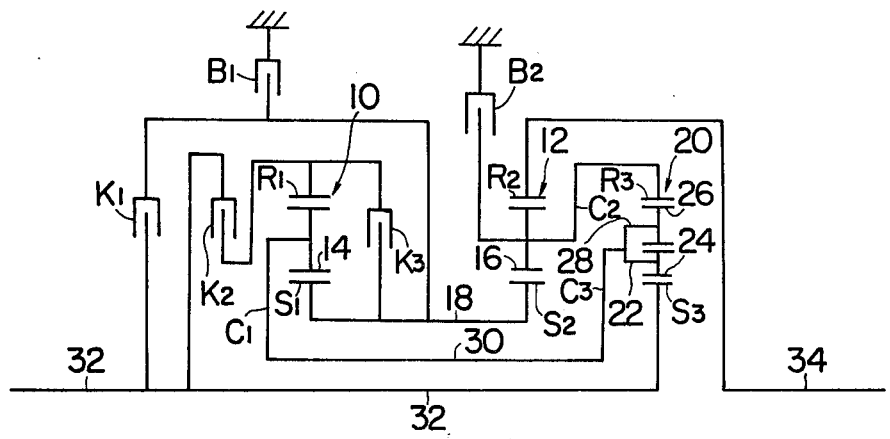
FIG. 1 is a schematic view of an upper half of a first preferred embodiment of a four-speed transmission according to the present invention.
Figure 2:
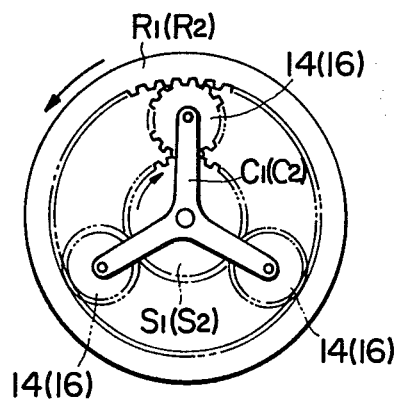
FIG. 2 is a front end view of a representative example of a basic planetary gearset incorporated in FIG. 1.

The transmission schematically illustrated in FIG. 1 includes a first basic planetary gear set 10 and a second basic planetary gear set 12 (see FIG. 2). Gearset 10 includes a ring gear $R_1$, a sun gear $S_1$, a carrier $C_1$ and planet pinions 14 journaled rotatably upon the carrier $C_1$. Gearset 12 includes a ring gear $R_2$, a sun gear $S_2$, a carrier $C_2$ and planet pinions 16 which are journaled rotatably upon the carrier $C_2$.

Sun gears $S_1$ and $S_2$ are splined to or connected to a hollow shaft 18 for simultaneous rotation therewith. If desired, the sun gears $S_1$ and $S_2$ may be formed as a common sun gear.

Figure 3:
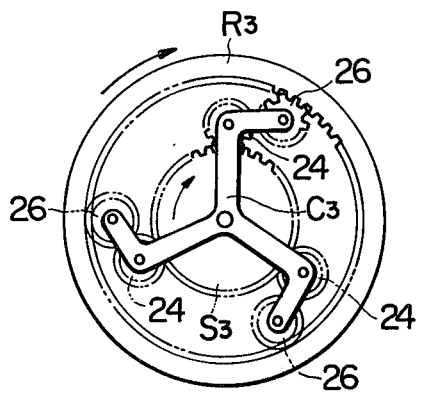
FIG. 3 is a front end view of a representative example of a dual intermeshed planet pinion planetary gearset incorporated in FIG. 1.

A dual intermeshed planet pinion planetary gearset 20 includes a ring gear $R_3$, a sun gear $S_3$, a carrier $C_3$, planet pinion shafts 22 fixed to the carrier $C_3$ and planet pinions 24 journaled rotatably upon shafts 22 so that they mesh with the sun gear $S_3$ (see also FIG. 3). Pinions 24 mesh with other pinions 26 which also are journaled by means of pinion shafts 28 fixed to the carrier $C_3$. Pinions 26 mesh with the ring gear $R_3$. It will be noted that the second basic planetary gearset 12 is located between the first basic planetary gearset 10 and dual intermeshed planet pinion planetary gearset 20.

Carriers $C_1$ and $C_3$ are splined to or connected to a hollow shaft 30 extending through the hollow shaft 18 for simultaneous rotation therewith. If desired, the carriers $C_1$ and $C_3$ may be formed as a common carrier.

Ring gear $R_3$ is connected to carrier $C_2$ for simultaneous rotation therewith.

An input shaft 32 extends through hollow shaft 30. Sun gear $S_3$ is connected to or splined to the input shaft 32 for simultaneous rotation therewith. The input shaft 32 is driven by an engine through a torque converter or fluid coupling, although not shown.

An output shaft 34 is axially aligned with the input shaft 32. Ring gear $R_2$ is splined to or connected to the output shaft 34 for simultaneous rotation therewith.

A first clutch $K_1$ is provided and adapted to engage the input shaft 32 with shaft 18. A second clutch $K_2$ is provided and adapted to engage the input shaft 32 with ring gear $R_1$. A third clutch $K_3$ is provided and adapted to engage ring gear $R_1$ with shaft 18.

A first brake $B_1$ is provided and adapted to anchor shaft 18. A second brake $B_2$ is provided and adapted to anchor carrier $C_2$ and ring gear $R_3$.

From the preceding statement and FIG. 1 it will be noted that planetary gear sets 10, 12 and 20 are arranged concentrically about shaft 32.

The gearing is controlled in the following manner:

1st Speed

For first speed, the clutch $K_3$ is engaged and the brake $B_2$ applied and a power is transmitted from the sun gear $S_3$ to output shaft 34 through carrier $C_3$, carrier $C_1$, sun gear $S_1$, shaft 18 sun gear $S_2$ and ring gear $R_2$. Under this condition, since ring gear $R_3$ is held stationary or braked by brake $B_2$, carrier $C_3$ rotates in the opposite direction to a direction of rotation of sun gear $S_3$ (or input shaft 32) at a reduced speed. This reduced rotation of the carrier $C_3$ is transmitted to carrier $C_1$ through shaft 30. Since ring gear $R_1$ and sun gear $S_1$ are locked by clutch $K_3$, first planetary gearset 10 rotates as a unit. Sun gear $S_2$ rotates as sun gear $S_1$ does through shaft 18. Since carrier $C_2$ is held stationary by brake $B_2$, ring gear $R_2$ rotates in the opposite direction to a direction of rotation of sun gear $S_2$ at a reduced speed. This reduced rotation of ring gear $R_2$ is transmitted to output shaft 34. It will be noted that rotation of output shaft 34 is in the same direction as input shaft 32, but at a reduced speed.

From the preceding statement, it will be apparent that there is no rotary element which will rotate faster than input shaft 32.

2nd Speed

For second speed, the clutch $K_3$ is engaged and the brake $B_1$ applied and a power is transmitted from sun gear $S_3$ to output shaft 34 through, ring gear $R_3$, carrier $C_2$, and ring gear $R_2$ because carrier $C_3$ and sun gear $S_2$ are held stationary because interlocked ring gear $R_1$ and sun gear $S_1$ are held stationary by brake $B_1$. Under this condition, ring gear $R_3$ rotates in the same direction as sun gear $S_3$ (input shaft 32), but at a reduced speed. This reduced rotation of ring gear $R_3$ is transmitted to carrier $C_2$. Ring gear $R_2$, then, rotates in the same direction as carrier $C_2$ does at an increased speed because sun gear $S_2$ is held stationary. This rotation of ring gear $R_2$ is transmitted to output shaft 34.

From the preceding statement, it will be apparent that there is no rotary elements which will rotate faster than input shaft 32 does.

3rd Speed

For third speed, the clutch $K_3$ is engaged and clutch $K_2$ engaged. Under this condition a direct drive is obtained because all gearsets 10, 12 and 20 rotate as a unit.

4th Speed (Over Drive)

For fourth speed (over drive), the clutch $K_2$ is engaged and brake $B_1$ applied and a power is transmitted from sun gear $S_3$ to ring gear $R_2$ through ring gear $R_3$ and carrier $C_2$ because sun gear $S_2$ is held stationary and carrier $C_3$ rotates in the same direction as, but at a reduced speed, sun gear $S_3$. Since sun gear $S_1$ is held stationary, rotation of input shaft delivered to ring gear $R_1$ through clutch $K_2$ is transmitted to carrier $C_1$ and then carriers $C_1$ and $C_3$ rotate in the same direction as input shaft 32 but at a reduced speed. Since carrier $C_3$ rotates in the same direction as sun gear $S_3$ but at a reduced speed, ring gear $R_3$ and carrier $C_2$ rotate in the same direction. Since sun gear $S_2$ is held stationary, ring gear $R_2$ rotates in the same direction as carrier $C_2$ but at an increased speed. Therefore, suitably selecting the number of teeth of each rotary elements of gearsets 10, 12 and 20, an overdrive can be obtained.

From the preceding statement it is apparent that there is no rotary element which will rotate faster than output shaft 34.

Rev.

For reverse, the clutch $K_1$ is engaged and brake $B_2$ applied. Under this condition, since sun gear $S_3$ rotates as input shaft 32 and carrier $C_2$ is held stationary, ring gear $R_2$ rotate in the opposite direction to sun gear $S_2$ and at a reduced speed.

The sequence for engagement and disengagement or release of the various clutches and brakes in the transmission of FIG. 1 is illustrated in the following Table. The gear ratios are calculated on the assumption that $a_1 = a_2 = a_3 = 0.45$, where: $a_1$ is the ratio of the number of teeth of the sun gear $S_1$ to that of the ring gear $R_1$ in the first basic planetary gearset 10; $a_2$ the ratio of the number of teeth of the sun gear $S_2$ to that of the ring gear $R_2$ in the second basic planetary gearset 12; and $a_3$ the ratio of the number of teeth of the sun gear $S_3$ to that of the ring gear $R_3$ in the dual intermeshed pinion planetary gearset 20.

In the following Table legend X indicates the condition when a particular friction member is engaged or applied.

Table

| | $K_1$ | $K_2$ | $K_3$ | $B_1$ | $B_2$ | | Gear Ratio |
|---|---|---|---|---|---|---|---|
| 1st speed | | X | | | X | $\frac{1-a_3}{a_2 a_3}$ | 2.72 |
| 2nd speed | | X | | X | | $\frac{1}{a_3(1+a_2)}$ | 1.53 |
| 3rd speed | | X | X | | | 1 | 1.00 |
| 4th speed | | X | | X | | $\frac{1}{(1+a_1 a_3)(1+a_2)} \cdot a_1$ | 0.83 |
| Rev. | X | | | | X | $\frac{1}{a_2}$ | 2.22 |

Figure 4:
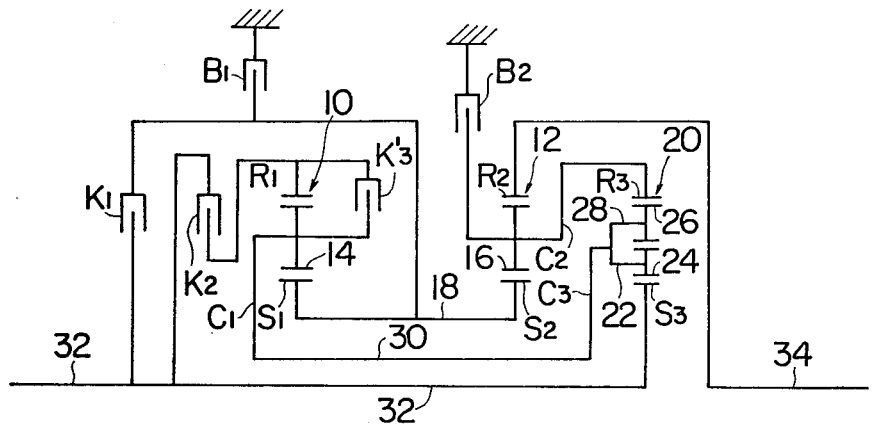
FIG. 4 is a schematic view of a second preferred embodiment of a four-speed transmission according to the present invention.

Referring to FIG. 4 embodiment, this embodiment differs from first embodiment only in that, instead of the third clutch $K_3$ in the first embodiment, a third clutch $K'_3$ is provided and adapted to connect ring gear $R_1$ to carrier $C_1$.

Figure 5:
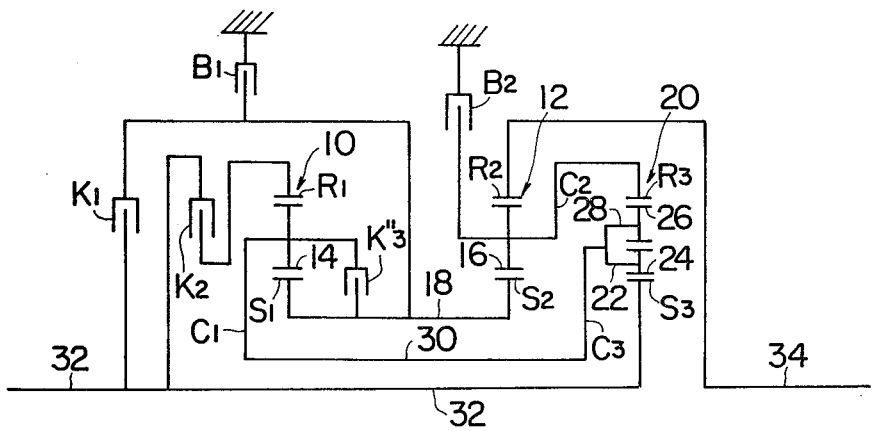
FIG. 5 is a schematic view of a third preferred embodiment of a four-speed transmission according to the present invention.

Referring to FIG. 5 embodiment, this embodiment differs from the first embodiment only in that, instead of the third clutch $K_3$ in the first embodiment a third clutch $K''_3$ is provided and adapted to connect carrier $C_1$ to sun gear $S_1$ through shaft 18.

The four-speed transmission constructed as described in the preceding statements has the following advantages:

(1) Since three planetary gearsets, three clutches and two brakes are appropriately combined, the optimum gear ratios for use with automotive vehicles, particularly passenger cars, are obtained by engaging two of the clutches and brakes.

(2) Since an over drive is provided, good fuel economy and silent operation of an automotive vehicle are accomplished because vehicle operation with low engine speed is possible.

(3) Since during all forward speeds, there is no rotary element which rotates faster than an input shaft or an output shaft, the overload on shafts rotatably journaling rotary elements and rattle thereof are eliminated. Although there is rotary element (ring gear $R_1$) which rotates faster than input shaft during reverse, it is not a problem because engine speed can be lowered.

What is claimed is:

1. A change-speed transmission, comprising:
   a first basic planetary gearset having three rotary elements which are a sun gear, a carrier and a ring gear;
   a second basic planetary gearset which has a sun gear, a carrier and a ring gear;
   a dual intermeshed planet pinion planetary gearset which has a sun gear, a carrier and a ring gear;
   said sun gears of said first and second basic planetary gearsets being connected with each other for simultaneous rotation;
   an input shaft;
   an output shaft;
   said carriers of said first basic planetary gearset and said dual intermeshed planet pinion planetary gearset being connected with each other for simultaneous rotation;
   said carrier of said second basic planetary gearset and said ring gear of said dual intermeshed planet pinion planetary gearset being connected with each other for simultaneous rotation;
   said sun gear of said dual intermeshed planet pinion planetary gearset being connected with said input shaft for simultaneous rotation therewith;
   said ring gear of said second basic planetary gearset being connected with said output shaft;

first clutch means for connecting said sun gears of said first and second basic planetary gearsets with said input shaft;

second clutch means for connecting said ring gear of said first basic planetary gearset with said input shaft;

third clutch means for connecting two of said three rotary elements of said first basic planetary gearset together;

first brake means for braking said sun gears of said first and second basic planetary gearsets; and second brake means for braking said carrier of said second basic planetary gearset and said ring gear of said dual intermeshed planet pinion planetary gearset.

2. A change-speed transmission as claimed in claim 1, in which said ring gear of said first basic planetary gearset and said sun gear thereof are connectable by said third clutch means.

3. A change-speed transmission as claimed in claim 1, in which said ring gear of said first basic planetary gearset and said carrier thereof are connectable by said third clutch means.

4. A change-speed transmission as claimed in claim 1, in which said carrier of said first basic planetary gearset and said sun gear thereof are connectable by said third clutch means.

* * * * *